United States Patent [19]

Meguro et al.

[11] Patent Number: 5,626,805
[45] Date of Patent: May 6, 1997

US005626805A

[54] PROCESS OF MAKING VINYLIDENE FLUORIDE POROUS MEMBRANE

[75] Inventors: Kazuhiro Meguro, Ryugasaki; Toshiya Mizuno, Tsuchiura; Yoshikiti Teramoto, Ami-machi; Hiroshi Sato, Tamari-mura, all of Japan

[73] Assignee: Kureha Chemical Industry Co., Ltd., Tokyo, Japan

[21] Appl. No.: 477,888

[22] Filed: Jun. 7, 1995

Related U.S. Application Data

[62] Division of Ser. No. 318,332, Oct. 5, 1994, Pat. No. 5,514,461.

[30] Foreign Application Priority Data

Oct. 5, 1993 [JP] Japan .................................. 5-273045

[51] Int. Cl.$^6$ ........................................ B29C 67/20
[52] U.S. Cl. ................ 264/41; 264/210.2; 264/210.6; 264/211; 264/211.12; 264/211.19; 264/288.8; 264/289.3; 264/344
[58] Field of Search ........................ 264/41, 210.2, 264/210.6, 211, 211.12, 211.19, 288.8, 289.3, 344

[56] References Cited

U.S. PATENT DOCUMENTS

| | | | |
|---|---|---|---|
| 4,238,571 | 12/1980 | Mano et al. | 521/62 |
| 4,629,563 | 12/1986 | Wrasidlo | 210/500.34 |
| 4,869,857 | 9/1989 | Itoh et al. | 264/41 |
| 5,022,990 | 6/1991 | Doi et al. | 210/500.42 |
| 5,221,479 | 6/1993 | Etoh et al. | 210/636 |
| 5,387,378 | 2/1995 | Pintauro et al. | 264/48 |

FOREIGN PATENT DOCUMENTS

| | | |
|---|---|---|
| 49-8506 | 2/1974 | Japan . |
| 52-51465 | 4/1977 | Japan . |
| 63-248405 | 10/1988 | Japan . |
| 3-215535 | 9/1991 | Japan . |
| 4-239041 | 8/1992 | Japan . |
| 4-50053 | 8/1992 | Japan . |

*Primary Examiner*—Leo B. Tentoni
*Attorney, Agent, or Firm*—Sherman and Shalloway

[57] ABSTRACT

A method of making a polyvinylidene fluoride porous membrane having an asymmetric structure, excellent mechanical strength and a narrow range of pore diameter distribution comprises: blending (i) 100 parts by weight of a vinylidene fluoride resin having an inherent viscosity, measured in dimethylformamide at a concentration of 0.4 g/dl and a temperature of 30° C., of 1.4 to 15.0, (ii) 30 to 250 parts by weight of an aliphatic polyester plasticizer and, optionally and preferably, (iii) 1 to 50 parts by weight of a good solvent for vinylidene fluoride resin, to form a composition; extruding the so-formed composition to form a molten film; cooling one surface of the molten film by contact with a chill roll having a temperature of not more than 150° C. and air-cooling the other surface to make a solid film; and extracting the plasticizer from the solid film.

6 Claims, No Drawings

PROCESS OF MAKING VINYLIDENE FLUORIDE POROUS MEMBRANE

This is a division of application Ser. No. 08/318,332, filed Oct. 5, 1994, now U.S. Pat. No. 5,514,461.

BACKGROUND OF THE INVENTION

1. Field of the Invention

The present invention relates to a porous membrane which is used for a microfiltration membrane for drugs or bacteria, or which is used for a separator of a battery. More particularly, the invention relates to a vinylidene fluoride porous membrane which has an asymmetrical structure in which pores in opposite sides have different average diameters, which has excellent mechanical strength such as tensile strength at break and elongation at break, and which has pores having a diameter falling in a narrow range.

2. Description of Related Art

Porous membranes made of synthetic resins have conventionally found utility in many technical fields. For example, they are used for separating gases from gases, gases from liquids, and solids from liquids. They are also used as electric insulators, heat reserving materials, sound insulators, and heat insulators. When a porous membrane is used for separation, it must meet the following requirements that affect its performance. First, the porous membrane must have a suitable porosity in view of the separation efficiency. Second, the diameter of the pores must be uniform to achieve precise separation. Third, the membrane must have pores having a diameter which is suitable for the object to be separated. Materials which constitute a membrane are required to have chemical resistance to the object to be separated, wheatherability, heat resistance, and strength. Moreover, porous membranes must have sufficient levels of elongation at break and tensile strength at break. Presently, vinylidene fluoride resins, which have excellent wheatherability, chemical resistance, heat resistance, and mechanical strength, have been studied in hopes of employing them as porous membranes for separation.

Vinylidene fluoride resins, however, do not necessarily have desirable processing properties due to their non-adhesive character and poor compatibility. In addition, development of porous membranes has been focused on enhanced porosity and a narrow range distribution of the pore diameters, and so development of mechanical strength has not been emphasized. Accordingly, when a porous membrane is used as a filter membrane, a supporting membrane is superposed on the porous membrane in order to increase the mechanical strength. When a porous membrane is used as a separator of batteries, it desirably has a mechanical strength (elongation at break, tensile strength at break) that sufficiently withstands the winding forces incurred as it is wound around a core material in the manufacture of batteries. In addition, when used as a separator of batteries, a porous membrane desirably has penetrating pores having a diameter falling within a narrow range so that fine powders of the active material used in an electrode cannot pass therethrough, and it also has impregnating properties that allow an electrolyte to be impregnated efficiently in the membrane after it is wound on the core material. When a porous membrane is used as a microfiltration membrane, it is required to maintain high filtering properties for a prolonged period of time.

Japanese Patent Application Laid-open (kokai) No. 215535/1991 discloses a method in which an organic liquid such as diethyl phthalate and an organic fine powder (hydrophobic silica) are added to a polyvinylidene fluoride resin, and after the obtained mixture is melt-processed, the organic liquid and the hydrophobic silica are extracted. This method provides a porous membrane having relatively high mechanical strength. However, in the porous membrane according to this method, the average diameter of the pores in opposite sides of the membrane are not significantly different from each other, and are in fact almost identical. Thus, the membrane of that publication does not have an asymmetrical structure. Consequently, highly efficient impregnating properties desired of a battery separator, or long-term filtering properties desired of a microfiltration membrane cannot be expected. Moreover, an aqueous alkaline solution employed for extracting hydrophobic silica tends to cause deterioration of vinylidene fluoride resin.

In view of the foregoing, the inventors of the present invention conducted extensive studies and found that a vinylidene fluoride porous membrane of an asymmetrical structure having a highly efficient impregnating property when used as a separator for a battery and long-lasting high filtration properties when used as a microfiltration membrane, having excellent mechanical strength such as elongation at break or tensile strength at break, can be obtained by a method in which a vinylidene fluoride resin having a specific inherent viscosity and a specific plasticizer are formed into a membrane by melt-processing, followed by a specific post-treatment.

SUMMARY OF THE INVENTION

Accordingly, an object of the present invention is to provide a vinylidene fluoride porous membrane of an asymmetrical structure, having a highly efficient impregnating property when used as a separator for a battery and long-lasting high filtration properties when used as a microfiltration membrane, as well as excellent mechanical strength such as elongation at break or tensile strength at break.

Another object of the present invention is to provide a method of preparing the vinylidene fluoride porous membrane described above.

In one aspect of the present invention, there is provided a vinylidene fluoride porous membrane made of a vinylidene fluoride resin having an inherent viscosity from 1.3 to 15.0 (dl/g), the membrane comprising pores which satisfy the following numerical expression (A):

$$4.0 < P_1/P_2 \leq 10.00 \tag{A}$$

wherein $P_1$ is an average diameter (μm) of pores in a surface which has a larger average diameter of pores, and $P_2$ is an average diameter (μm) of pores in the other surface of the membrane.

Preferably, the vinylidene fluoride membrane have pores such that the ratio of the maximum pore diameter $P_4$ measured by a bubble point method to the mean flow pore diameter $P_3$ measured by a half dry method is not more than 2.0.

Preferably, the vinylidene fluoride porous membrane according to the invention also satisfies the following numerical expression (B):

$$[Tb \times Eb/(100-\phi)] \times 100 \geq 1000 \tag{B}$$

wherein $\phi$ is the ratio of porosity (% by volume), Tb is the tensile strength at break, and Eb is the % elongation at the break point.

In a second aspect of the present invention, there is provided a method of preparing a vinylidene fluoride porous membrane having pores which satisfy the following numerical expression (A):

$$4.0 < P_1/P_2 \leq 10.00 \tag{A}$$

wherein $P_1$ is an average diameter (μm) of pores in a surface which has a larger average diameter of pores, and $P_2$ is an average diameter (μm) of pores in the other surface of the membrane, the method comprising the steps of:

adding, as a plasticizer, 30 to 250 parts by weight of an aliphatic polyester to 100 parts by weight of a vinylidene fluoride resin having an inherent viscosity from 1.4 to 15.0 (dl/g), extruding the resultant composition to form a molten membrane, cooling one surface of the extruded molten membrane by means of a chill roll having a temperature of not more than 150° C. and air-cooling the other surface to make a solid membrane, and extracting the plasticizer from the membrane.

In a third aspect of the present invention, there is provided a method of preparing a vinylidene fluoride porous membrane having pores which satisfy the following numerical expression (A):

$$4.0 < P_1/P_2 \leq 10.00 \tag{A}$$

wherein $P_1$ is an average diameter (μm) of pores in a surface which has a larger average diameter of pores, and $P_2$ is an average diameter (μm) of pores in the other surface of the membrane, the method comprising the steps of:

adding 30 to 250 parts by weight of an aliphatic polyester as a plasticizer, and 1 to 50 parts by weight of a solvent which has a good compatibility with vinyl fluoride resins (hereinafter referred to as a good solvent) to 100 parts by weight of a vinylidene fluoride resin having an inherent viscosity from 1.4 to 15.0 (dl/g), extruding the resultant composition to form a molten membrane, cooling one surface of the extruded molten membrane by means of a chill roll having a temperature of not more than 150° C. and air-cooling the other surface to make a solid membrane, and extracting the plasticizer from the membrane.

The above and other objects, features and advantages of the present invention will become apparent from the following description.

DESCRIPTION OF THE PREFERRED EMBODIMENTS

The vinylidene fluoride resins which are used in the present invention are homopolymers of vinylidene fluoride, copolymers which contain not less than 70 mol % of vinylidene fluoride as a unit of monomer constituent, or a mixture of these polymers. Examples of monomers which are copolymerized with vinylidene fluoride include ethylene tetrafluoride, propylene hexafluoride, ethylene trifluoride, ethylene chloride trifluoride, and vinyl fluoride. They are used Singly or in combination of two or more. The inherent viscosity of the starting vinylidene fluoride resin is from 1.4 to 15.0 (dl/g), preferably from 1.5 to 10.00 (dl/g), and more preferably from 1.6 to 8.0 (dl/g). If the inherent viscosity of the starting vinylidene fluoride resin falls within these ranges, a porous membrane having excellent mechanical strength in terms of elongation at break and tensile strength at break, and a uniform pore diameter can be obtained. In the present invention, the inherent viscosity is measured using dimethylformamide as a solvent at a concentration of 0.4 g/dl and a temperature of 30° C. If the inherent viscosity of the starting vinylidene fluoride is in the above ranges, the inherent viscosity of the resultant vinylidene fluoride when measured on a sample of the invention membrane is almost as same as that of the starting material, i.e., from 1.3 to 15 (dl/g). The vinylidene fluoride resin may contain antioxidants, antistatic agents, lubricants, surfactants, etc. The plasticizer which is used in the present invention plasticizes vinylidene fluoride resins. Examples of a suitable plasticizer include aliphatic polyester plasticizers which are obtained from a dibasic acid of an aliphatic series and glycol, and specifically include adipic polyesters such as adipic acid—propylene glycol and adipic acid—1,3-butylene glycol; sebacic polyesters such as sebacic acid—propylene glycol and sebacic acid—1,3-butylene glycol; azelaic polyesters such as azelaic acid propylene glycol and azelaic acid—1,3-butylene glycol. Among these, adipic polyesters are particularly preferred in view of the compatibility with vinylidene fluoride. The amount of the plasticizer is from 30 to 250, preferably from 40 to 170, and more preferably from 50 to 120 parts by weight based on 100 parts by weight of vinylidene fluoride.

In the present invention, it is preferable that a good solvent which satisfactorily dissolves vinylidene fluoride be incorporated in addition to a plasticizer. When a good solvent is used, porous membranes having a ratio $P_4/P_3$ falling in a narrower distribution can be obtained. A good solvent for vinylidene fluoride is defined as a solvent which can dissolve a vinylidene fluoride resin in a temperature range from 20° to 250° C. Specific examples of a good solvent include N-methylpyrrolidone, dimethylformamide, dimethylacetamide, dimethylsulfoxide, methylethylketone, acetone, tetrahydrofuran, dioxane, ethyl acetate, propylene carbonate, cyclohexane, methylisobutylketone, and dimethylphthalate. Of these, N-methylpyrrolidone is preferred in view of the stability at high temperatures. It is preferred that the amount of the good solvent be 1 to 50 parts by weight, and preferably 10 to 35 parts by weight based on 100 parts by weight of the vinylidene fluoride resin.

The vinylidene fluoride porous membrane is manufactured by forming a film from a composition comprising a vinylidene fluoride resin, a plasticizer, and optionally, a good solvent, then extracting the plasticizer or the good solvent. In order to form a film, a melt-extrusion processing method which is commonly employed in processing of vinylidene fluoride may be used. The temperature of the melt of the resin composition at the time of processing is preferably from 170° to 250° C., and more preferably from 180° to 240° C. In the step of extrusion, the composition is extruded through a die, preferably a T-die, to form a film having a thickness of from 10 to 300 μm, and more preferably from 20 to 100 μm. In this step, one side of the extruded film is preferably cooled by means of a chill roll at not higher than 150° C., and preferably from 30° to 100° C., and the other side is cooled in air. In order to perform air cooling, air may be used. Thus, by cooling one side more rapidly than the other side, a vinylidene fluoride porous membrane having an asymmetrical structure can be obtained.

The solvent for extracting the plasticizer or the good solvent from the film is not particularly limited as long as it does not dissolve the vinylidene fluoride resin but dissolves the plasticizer or the good solvent. Examples of such a solvent include methanol and isopropyl alcohol; and methylene chloride and 1,1,1-trichloroethane among hydrocarbon chloride.

Extraction is preferably performed by allowing the film to stand in an extraction solvent at 10° to 150° C., preferably 15° to 100° C., and more preferably 20° to 50° C. Vibration may be applied to accelerate extraction. After the plasticizer or the good solvent is extracted, the resulting porous membrane is treated with heat at 50° to 150° C. for 0.5 to 360 minutes to until it is dry. In the drying step, it is preferable that the circumference of the porous membrane be held by a frame to prevent shrinkage in the course of drying, or the membrane may undergo extraction and drying in an unrestrained state, followed by being uni- or bi-axially stretched until the wrinkles generated during drying are eliminated.

Following the above described steps, the vinylidene fluoride porous membrane of the invention can be obtained. It may be further processed by uni- or bi-axial stretching. The stretching ratio is preferably 1.5 to 3. The thus stretched porous membrane also satisfies the above-described numerical expression (A), and therefore, it is encompassed by the scope of the present invention.

The porous membrane of the invention generally has a porosity from 20 to 80%, and preferably from 25 to 60%. The thickness of the membrane is from 10 to 300 μm, and preferably from 10 to 100 μm. The mean flow pore diameter $P_3$ measured by a half dry method is 0.01 to 10 μm, and the ratio of the maximum pore diameter $P_4$ measured by a bubble point method to $P_3$ is not more than 2.0, and more preferably not more than 1.8. Since the ratio $P_4/P_3$ is small, i.e., the distribution of the pore diameters has a narrow range, the porous membrane of the invention can perform separation of high precision when used as a separating membrane. Membranes having $P_4$ of not more than 10.0 μm are suitable for microfiltration, and those having $P_3$ of 0.01 to 2.0 μm are usable as a separator in batteries. The porous membrane according to the present invention has pores which satisfy the following numerical expression (A):

$$4.0 < P_1/P_2 \leq 10.00 \quad (A)$$

wherein $P_1$ is the average pore diameter (μm) in a surface which has a larger average pore diameter, and $P_2$ is the average pore diameter (μm) in the other surface of the membrane. In particular, the porous membrane according to the invention satisfies both the above numerical expression (A) and the following numerical expression (B):

$$[Tb \times Eb/(100-\phi)] \times 100 \geq 1000 \quad (B)$$

wherein $\phi$ is the ratio of porosity (% by volume), Tb is the stress at the break point (MPa), and Eb is the % elongation at the break point. The left side of expression (B) is preferably 5000 to 50000.

When a porous membrane satisfies the numerical expressions (A) and (B), the membrane, when used as a separator of batteries, has sufficient mechanical strength to withstand the winding process in the manufacture of batteries. Moreover, the porous membrane has penetrating pores having a diameter falling in a narrow range so that fine powder of the active material used in an electrode cannot be passed therethrough. Furthermore, owing to the asymmetrical structure in which pores in opposite sides have different average diameters, the membrane has impregnating properties that allow an electrolyte to be impregnated efficiently in the membrane after the membrane is wound on the core material. When the porous membrane is used as a microfiltration membrane, it provides satisfactory separation performance, as well as good, long-term filtration properties.

EXAMPLES

The present invention will further be described by way of examples, which should not be construed as limiting the invention. The methods employed for various measurements in the Examples and Comparative Example are described below.

Measuring Method

1. Tensile strength at break and elongation at break:

A tensile/elongation measuring apparatus (Tensiron RTM-100, manufactured by Orientec Co.) was used. Test samples were porous membranes made of a vinylidene fluoride resin (10 mm wide×100 mm long). The tensile strength at break and elongation at break of each sample were measured with the distance between chucks being 50 mm and the speed of testing of stressing being 25 mm/min. The obtained data were input into the following equations to obtain the stress and % elongation at the point of break.

Tensile stress at break (MPa)=[Force at the point of break (Kgf)/Cross section of the sample before the test (cm$^2$)]×0.0981

Elongation at break (%)=[Amount of elongation until the point of break was reached (displacement) (mm)/50 (mm)]×100

2. Porosity:

Using a PMI porosimeter (by Porous Materials Inc.) and mercury, the volume of voids was measured. Porosity was obtained based on the following equation. The maximum pressure during the measurement was 20,000 PSI (1,406 kg/cm$^2$).

Porosity (%)=(Volume of pores/volume of porous membrane)×100

3. Mean flow pore diameter ($P_3$):

The mean flow pore diameter ($P_3$) was measured by a half-dry method (ethanol) using a sample having a test area of 20 mmφ, and in accordance with the test method specified by ASTM F-316-86.

4. Maximum pore diameter ($P_4$):

The maximum pore diameter ($P_4$) was measured by a bubble point method (ethanol) using a sample having a test area of 20 mmφ, and in accordance with ASTM F-316-86.

5. Average diameters of pores ($P_1$, $P_2$):

The surfaces of the porous membranes were observed under a scanning electron microscope. Weighted averages were obtained of the average lengths of the semimajor axis and the semiminor axis.

Example 1

50 parts by weight of an adipic polyester plasticizer (PN-640, by Asahi Denka Kogyo K.K.) were added to 100 parts by weight of a polyvinylidene fluoride resin (PVDF) (KF#1600, by Kureha Chemical Industry, Co., Ltd.) having an inherent viscosity of 1.6 (dl/g), and mixed with a Henschel mixer. The mixture was melt-extruded at 240° C. and pelletized. The obtained pellets were melt-extruded with a melt-extruder equipped with a T-die having a width of 350 mm and a lip clearance of 1.4 mm at 240° C. into a film 50 μm thick. One surface was cooled with a chill roll at 60° C. and the other surface was cooled with air to form a continuous solid film.

The obtained film was cut into pieces of 200×200 mm, and they were immersed in methylene chloride for 10 minutes to extract the plasticizer. During the immersion, vibration was applied to the pieces. Subsequently, the resultant porous membrane pieces were held by a frame at their four sides and dried at 100° C. for 30 minutes to obtain final porous membranes of vinylidene fluoride. The inherent viscosity of a sample of the polyvinylidene fluoride porous membrane, porosity, average diameters of pores ($P_1$, $P_2$), mean flow pore diameter and maximum pore diameter ($P_3$, $P_4$), tensile strength at break, and elongation at break were measured. The data are shown in Table 1. Here, $P_1$ is the average pore diameter in the side to which a chilled roll was applied, and $P_2$ is the average pore diameter in the side to which an air cooling was applied.

Example 2

50 parts by weight of an adipic polyester plasticizer (PN-640, by Asahi Denka Kogyo K.K.) and 17 parts by weight of N-methylpyrrolidone were added to 100 parts by weight of a polyvinylidene fluoride resin (PVDF) (KF#1600, by Kureha Chemical Industry, Co., Ltd.) having an inherent viscosity of 1.6 (dl/g), and mixed with a Henschel mixer. The mixture was melt-extruded at 240° C. and pelletized. The obtained pellets were melt-extruded with a melt-extruder equipped with a T-die having a width of 350 mm and a lip clearance of 1.4 mm at 240° C. into a film 50 μm thick. One surface was cooled with a chill roll at 60° C. and the other surface was cooled with air to form a continuous solid film.

The obtained film was immersed in methylene chloride for 10 minutes to extract the plasticizer and the solvent. During the immersion, ultrasonic vibration was applied to the film. Subsequently, the resultant porous membrane was dried with air at 50° C., during which time the membrane was not restrained, and it was then rolled around a reel. The membrane was stretched uni-axially by 50% on a metal roll at 30° C. at a speed of 1 m/min, and then was thermally treated on a metal roll at 100° C. for 2 minutes. As a result, a continuous vinylidene fluoride porous membrane was obtained. The inherent viscosity of a sample of the polyvinylidene fluoride porous membrane, porosity, average pore diameters ($P_1$, $P_2$), mean flow pore diameter and maximum pore diameter ($P_3$, $P_4$), tensile strength at break, and elongation at break were measured. The data are shown in Table 1. Here, $P_1$ is the average pore diameter in the side to which a chilled roll was applied, and $P_2$ is the average pore diameter in the side to which an air cooling was applied.

Example 3

117 parts by weight of an adipic polyester plasticizer (PN-150, by Asahi Denka Kogyo K.K.) and 17 parts by weight of N-methylpyrrolidone were added to 100 parts by weight of a polyvinylidene fluoride resin (PVDF) (KF#1600, by Kureha Chemical Industry, Co., Ltd.) having an inherent viscosity of 1.6 (dl/g), and mixed with a Henschel mixer. The mixture was melt-extruded at 200° C. and pelletized. The obtained pellets were melt-extruded with a melt-extruder equipped with a T-die having a width of 350 mm and a lip clearance of 1.4 mm at 180° C. into a film 50 μm thick. One surface was cooled with a chill roll at 60° C. and the other surface was cooled with air to form a continuous solid film.

Extraction of the plasticizer and solvent and thermal treatment for drying were performed in a manner similar to that described in Example 1 to obtain a vinylidene fluoride porous membrane. The membrane properties and mechanical strength were measured in a manner similar to that described in Example 1. The results are shown in Table 1. Here, $P_1$ is the average pore diameter in the side to which a chilled roll was applied, and $P_2$ is the average pore diameter in the side to which an air cooling was applied.

Comparative Example 1

Using a commercially available vinylidene fluoride porous membrane, Durapore $GVHP_{00010}$ (by Millipore Co.), the properties investigated in Examples 1 to 3 were measured. The results are shown in Table 1.

TABLE 1

|  | Ex. 1 | Ex. 2 | Ex. 3 | Comp. Ex. 1 |
|---|---|---|---|---|
| Amounts of plasticizer added to 100 parts by weight of PVDF (parts by weight) | 50 | 50 | 117 | — |
| Amounts of good solvent added to 100 parts by weight of PVDF (parts by weight) | — | 17 | 17 | — |
| Inherent Viscosity of PVDF constituting the membrane (dl/g) | 1.50 | 1.49 | 1.47 | — |
| Porosity (% by volume) | 31 | 37 | 50 | 71 |
| $P_1$ (μm) | 0.42 | 0.89 | 0.51 | 0.74 |
| $P_2$ (μm) | 0.09 | 0.12 | 0.11 | 0.58 |
| $P_1/P_2$ | 4.7 | 7.5 | 4.6 | 1.3 |
| $P_3$ (μm) | 0.13 | 0.15 | 0.17 | 0.34 |
| $P_4$ (μm) | 0.22 | 0.22 | 0.22 | 0.47 |
| $P_4/P_3$ | 1.69 | 1.47 | 1.29 | 1.38 |
| Tensile Stress at Break Tb (MPa) | | | | |
| MD | 48.6 | 44.3 | 15.7 | 5.2 |
| TD | 40.4 | 41.9 | 13.5 | 4.9 |
| Elongation at Break Eb (%) | | | | |
| MD | 376 | 342 | 254 | 13 |
| TD | 547 | 596 | 250 | 27 |
| [Tb × Eb/(100-φ)] × 100 | | | | |
| MD | 26483 | 24049 | 7976 | 233 |
| TD | 32027 | 39639 | 6750 | 456 |

As is apparent from Table 1, the method of the present invention provided a porous membrane having an asymmetrical structure with satisfactory tensile strength at break and elongation at break. The distribution range of pore diameters was comparable to that of a conventional porous membrane obtained by a process different from the melt-extrusion process of the present invention (Comp. Ex.1).

According to the method of preparing a porous membrane of vinylidene fluoride provided by the present invention, a porous membrane having excellent mechanical strength such as tensile strength at break and elongation at break can be obtained. In addition, since the distribution of pore diameters of the obtained membrane has a narrow range, more precise separation can be achieved. Moreover, the high mechanical strength of the vinylidene fluoride porous membrane of the present invention eliminates the use of frames with which the membrane is supported, thereby enhancing manufacturability and utility. Furthermore, since the porous membrane of the present invention has an asymmetrical structure in which pores in opposite sides have different average diameters, good filtration performance can be maintained for a long term, allowing efficient impregnation of an electrolyte when the membrane is used as a separator in a battery.

What is claimed is:

1. A method of preparing a vinylidene fluoride porous membrane having pores which satisfy the following numerical expression (A):

$$4.0 < P_1/P_2 \leq 10.00 \quad (A)$$

wherein $P_1$ is an average pore diameter, measured in μm, in a surface which has a larger average pore diameter, and $P_2$ is an average pore diameter, measured in μm, in the other surface of the membrane, the method comprising the steps of:

adding, as a plasticizer, 30 to 250 parts by weight of an aliphatic polyester to 100 parts by weight of a vinylidene fluoride resin having an inherent viscosity, measured in dimethylformamide at a concentration of 0.4 g/dl and a temperature of 30° C., from 1.4 to 15.0 dl/g, to form a composition, extruding the so-formed composition to form a molten film, cooling one surface of the extruded molten film by contact with a chill roll having a temperature of not more than 150° C. and air-cooling the other surface to make a solid film, and extracting the plasticizer from the solid film.

2. A method of preparing a vinylidene fluoride porous membrane having pores which satisfy the following numerical expression (A):

$$4.0 < P_1/P_2 \leq 10.00 \qquad (A)$$

wherein $P_1$ is an average pore diameter, measured in μm, in a surface which has a larger average pore diameter, and $P_2$ is an average pore diameter, measured in μm, in the other surface of the membrane, the method comprising the steps of:

adding 30 to 250 parts by weight of an aliphatic polyester, as a plasticizer, and 1 to 50 parts by weight of a good solvent to 100 parts by weight of a vinylidene fluoride resin having an inherent viscosity, measured in dimethylformamide at a concentration of 0.4 g/dl and a temperature of 30° C., from 1.4 to 15.0 dl/g, to form a composition, extruding the so-formed composition to form a molten film, cooling one surface of the extruded molten film by contact with a chill roll having a temperature of not more than 150° C. and air-cooling the other surface to make a solid film, and extracting the plasticizer from the solid film.

3. The method according to claim 1, wherein the film from which the plasticizer has been extracted is dried while preventing the porous membrane from shrinking.

4. The method according to claim 2, wherein the film from which the plasticizer has been extracted is dried while preventing the porous membrane from shrinking.

5. The process according to claim 1, wherein the film from which the plasticizer has been extracted is dried while the porous membrane is unrestrained, and subsequently, the porous membrane is stretched.

6. The process according to claim 2, wherein the film from which the plasticizer has been extracted is dried while the porous membrane is unrestrained, and subsequently, the porous membrane is stretched.

* * * * *